(12) United States Patent
Lee et al.

(10) Patent No.: US 8,797,935 B2
(45) Date of Patent: Aug. 5, 2014

(54) METHOD OF PERFORMING RANDOM ACCESS IN MOBILE COMMUNICATION SYSTEM AND APPARATUS FOR THE SAME

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 13/023,981

(22) Filed: Feb. 9, 2011

(65) Prior Publication Data

US 2011/0194478 A1    Aug. 11, 2011

Related U.S. Application Data

(60) Provisional application No. 61/302,927, filed on Feb. 9, 2010.

(30) Foreign Application Priority Data

Jan. 31, 2011  (KR) .......................... 10-2011-0009400

(51) Int. Cl.
*H04H 20/71* (2008.01)

(52) U.S. Cl.
USPC .......................... 370/312; 370/314

(58) Field of Classification Search
USPC .......................... 370/312, 314, 315
See application file for complete search history.

(56) References Cited

U.S. PATENT DOCUMENTS

| | | | | |
|---|---|---|---|---|
| 8,208,851 | B2* | 6/2012 | Kwak et al. | 455/13.1 |
| 8,289,895 | B2* | 10/2012 | Yu et al. | 370/315 |
| 8,295,243 | B2* | 10/2012 | Malladi et al. | 370/331 |
| 8,355,388 | B2* | 1/2013 | Womack et al. | 370/338 |
| 2009/0088148 | A1* | 4/2009 | Chung et al. | 455/423 |
| 2009/0247072 | A1* | 10/2009 | Nakamura | 455/11.1 |

* cited by examiner

*Primary Examiner* — Andrew Lai
*Assistant Examiner* — Sumitra Ganguly
(74) *Attorney, Agent, or Firm* — Birch, Stewart, Kolasch & Birch, LLP (57) ABSTRACT

A method of performing a random access in a mobile communication system and an apparatus for the same are disclosed. The method of performing a random access includes transmitting a random access preamble to a network node and receiving a random access response from the network node, wherein the random access response is received through a first subframe if the random access preamble is a dedicated preamble, and the random access response is received through a second subframe which is different from the first subframe if the random access preamble is a non-dedicated preamble.

14 Claims, 10 Drawing Sheets

METHOD OF PERFORMING RANDOM ACCESS IN MOBILE COMMUNICATION SYSTEM AND APPARATUS FOR THE SAME

This application claims the benefit of priority on U.S. Provisional Application No. 61/302,927, filed on Feb. 9, 2010, the contents of which are hereby incorporated by reference in their entirety.

This application claims the benefit of the Korean Patent Application No. 10-2011-0009400, filed on Jan. 31, 2011, the contents of which are hereby incorporated by reference in their entirety.

BACKGROUND OF THE INVENTION

1. Field of the Invention

The present invention relates to a method of performing a random access in a mobile communication system and an apparatus for the same.

2. Discussion of the Related Art

Mobile communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, and so on.

SUMMARY OF THE INVENTION

Accordingly, the present invention is directed to a method of performing a random access in a mobile communication system and an apparatus for the same that substantially obviate one or more problems due to limitations and disadvantages of the related art.

Another object of the present invention is to provide a method of performing a random access in a wireless device and an apparatus for the same, which are limited to a wireless (or radio) interface in a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, in a method of performing a random access in a mobile communication system, the method of performing the random access includes transmitting a random access preamble to a network node and receiving a random access response from the network node, wherein the random access response is received through a first subframe if the random access preamble is a dedicated preamble, and the random access response is received through a second subframe which is different from the first subframe if the random access preamble is a non-dedicated preamble Also, the first subframe is a Multicast Broadcast over a Single Frequency Network (MBSFN) subframe.

Also, the second subframe is a non-Multicast Broadcast over a Single Frequency Network (non-MBSFN) subframe.

Also, the dedicated preamble is allocated through a Physical Downlink Control Channel (PDCCH) order.

Also, the method of performing a random access further includes monitoring a Relay-Physical Downlink Control Channel (R-PDCCH) if the random access preamble is the dedicated preamble.

Also, the monitoring step includes monitoring a Random Access-Radio Network Temporary Identifier (RA-RNTI) through the R-PDCCH.

Also, the MBSFN subframe is a backhaul subframe.

Also, the method of performing the random access further includes transmitting an uplink message to the network node after receiving the random access response and receiving a contention resolution message from the network node, wherein the uplink message includes a relay node identifier.

Also, the method of performing the random access further includes stopping transmission to an user equipment (UE) during receiving the random access response if the random access preamble is the dedicated preamble.

Also, the relay node identifier being received through a Relay-Physical Downlink Control Channel (R-PDCCH) is used for a contention resolution if the random access preamble is the dedicated preamble.

Meanwhile, to further achieve these and other advantages and in accordance with the purpose of the present invention, according to another aspect of the present invention, in a method of performing a random access in a mobile communication system, the method of performing the random access includes receiving a random access preamble from a relay node and transmitting a random access response to the relay node, wherein the random access response is transmitted through a first subframe if the random access preamble is a dedicated preamble, and the random access response is transmitted through a second subframe which is different from the first subframe if the random access preamble is a non-dedicated preamble.

Also, the first subframe is a Multicast Broadcast over a Single Frequency Network (MBSFN) subframe.

Also, the second subframe is a non-Multicast Broadcast over a Single Frequency Network (non-MBSFN) subframe.

Also, the dedicated preamble is allocated through a Physical Downlink Control Channel (PDCCH) order.

Also, the method of performing the random access further includes transmitting a Random Access-Radio Network Temporary Identifier (RA-RNTI) through a Relay-Physical Downlink Control Channel (R-PDCCH) if the random access preamble is the dedicated preamble.

Also, the MBSFN subframe is a backhaul subframe.

Also, the method of performing the random access further includes receiving an uplink message from the relay node after transmitting the random access response and transmitting a contention resolution message to the relay node, wherein the uplink message includes a relay node identifier.

Also, the relay node identifier being transmitted through a Relay-Physical Downlink Control Channel (R-PDCCH) is used for a contention resolution if the random access preamble is the dedicated preamble.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For example, the present invention will be described as follows provided that a 3GPP LTE based system will be given as an example of the mobile communication system according to the present invention. However, the present invention may also be applied in diverse types of mobile communication systems, such as an IEEE 802.16 based system.

First of all, as an example of a mobile communication system wherein the present invention is applied, the 3GPP LTE system will be described in detail.

Figure 1:
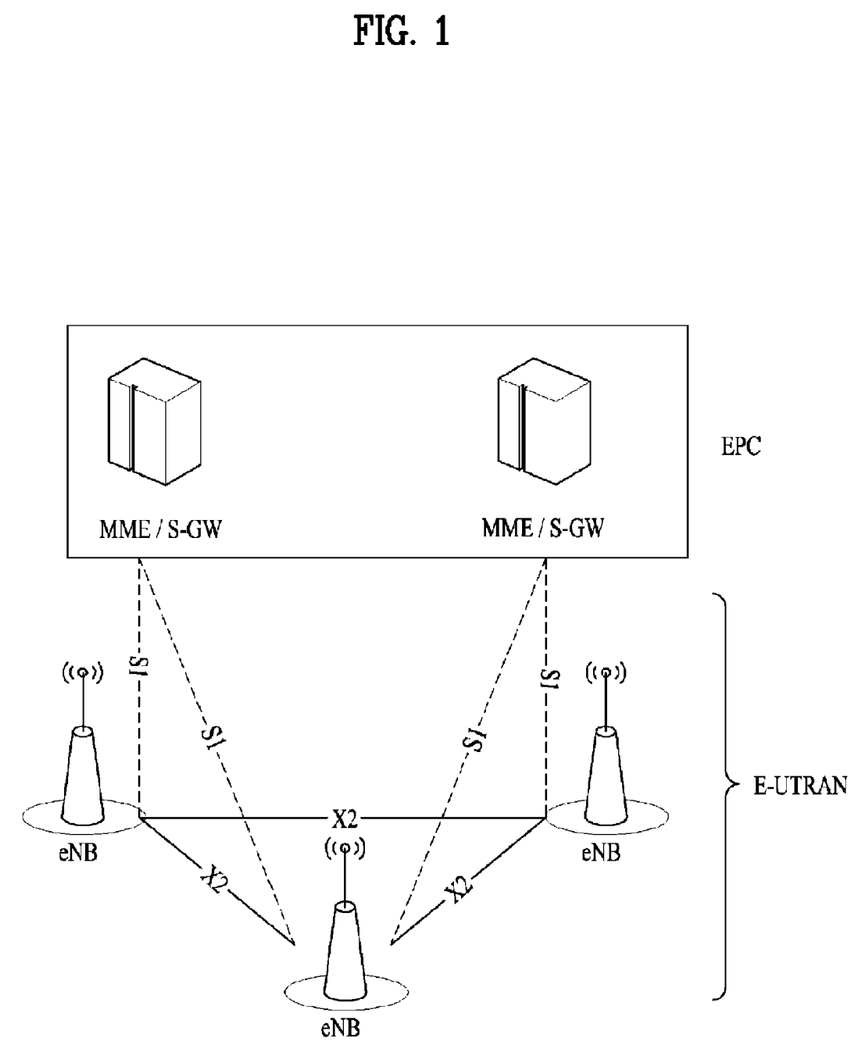
FIG. 1 illustrates an exemplary structure of an Evolved Universal Mobile Telecommunication System (E-UMTS)

FIG. 1 illustrates an exemplary structure of an Evolved Universal Mobile Telecommunication System (E-UMTS). The E-UMTS corresponds to an evolved version of the conventional UMTS, and the standardization procedure for the E-UMTS is currently under process in the 3GPP system. The E-UMTS is also referred to as a Long Term Evolution (LTE) system. The E-UMTS includes an Evolved Terrestrial Radio Access Network (E-UTRAN).

The Evolved Terrestrial Radio Access Network (E-UTRAN) is configured of a plurality of base stations (or evolved-NodeBs, hereinafter referred to as eNBs). And, each eNB is connected to one another by wire over an X2 interface. Herein, the eNB is connected to an user equipment (hereinafter referred to as UE) over a wireless (or radio) interface, and the eNB is connected to an Evolved Packet Core (EPC) by wire over an S1 interface. The Evolved Packet Core (EPC) is configured of a Mobility Management Entity (MME), a Serving-Gateway (S-GW), and a Packet Data Network-Gateway (PDN-GW). The MME carries access information of the UE or information on the capability of the UE. Such information is mainly used for managing the mobility of the UE. The S-GW corresponds to a gateway having the E-UTRAN as its end-point, and the PDN-GW corresponds to a gateway having the PDN as its end-point. A control message being exchanged by eNBs over the X2 interface uses an X2 Application Part (X2AP) protocol and is referred to as an X2AP message. Also, a control message being exchanged by the MME and the eNB over the S1 interface uses an S1 Application Part (S1AP) and is referred to as an S1AP message.

Layers of a Radio Interface Protocol between the UE and the eNB may be categorized as a first layer (L1), a second layer (L2), and a third layer (L3), based upon 3 lower layers of an Open System Interconnection (OSI) reference model, which is widely known in the communication system. Herein, a physical layer belonging to the first layer provides Information Transfer Service, which uses a physical channel. And, a Radio Resource Control (RRC) located in the third layer performs the role of controlling the wireless (or radio) resource between the UE and the network. In order to do so, the RRC layer exchanges an RRC message between the UE and eNB. Meanwhile, when using a technique for relaying data between the UE and the eNB, since a smooth communication cannot be realized if the distance between the UE and the eNB is too far, a relay process has been adopted in order to complement such disadvantage. Hereinafter, a relay node (hereinafter referred to as RN), which is an element of the relay process, and an interface related to the RN will be briefly described with reference to FIG. 2.

Figure 2:
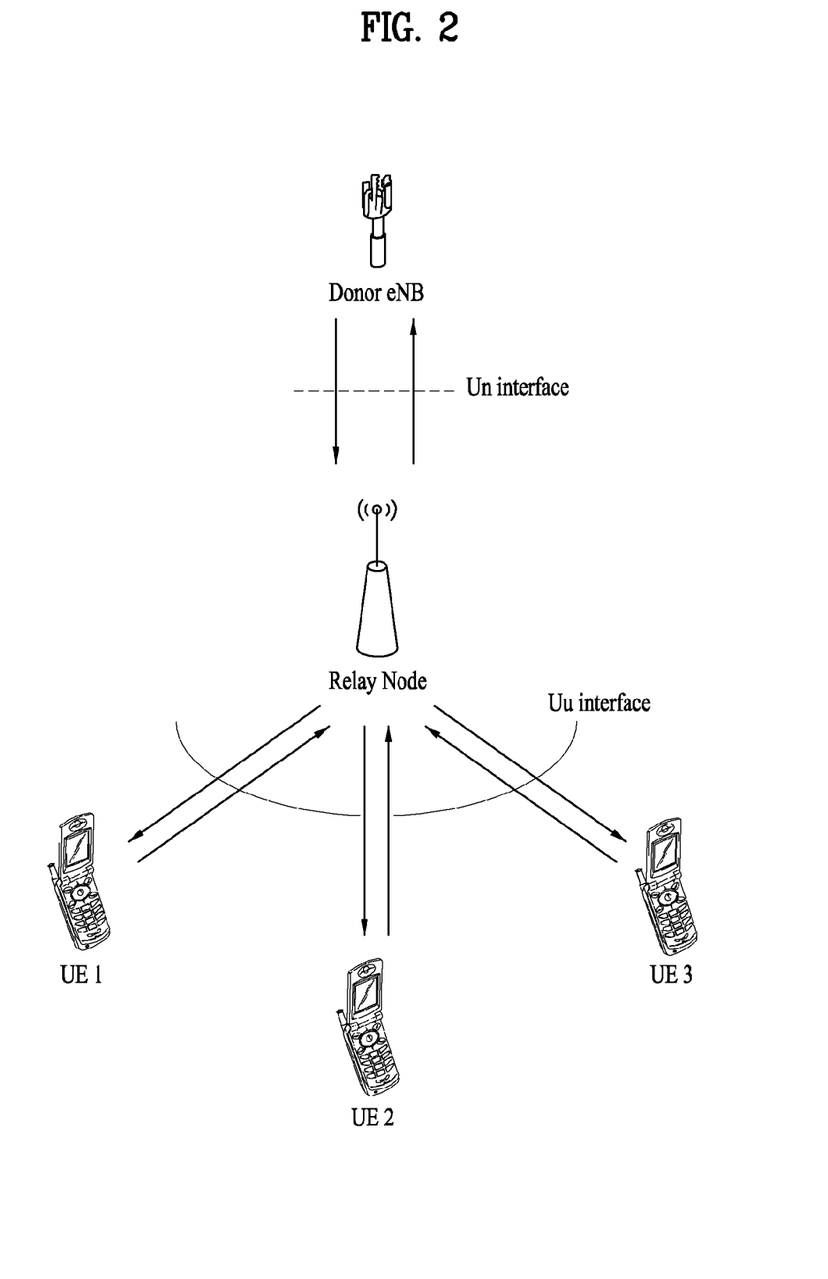
FIG. 2 illustrates a Relay node and a Un interface between the Relay node and an eNB, wherein the present invention is applied.

FIG. 2 illustrates a Relay Node and an Un interface between a RN and an eNB wherein the present invention is applied. A relay process refers to a technique for relaying data between the UE and the eNB. Since a smooth communication cannot be realized if the distance between the UE and the eNB is too far, the relay process is applied in order to complement such disadvantage. In order to perform the above-described relay process, a new wireless (or radio) device, which is referred to as an RN or a relay device is provided between the UE and the eNB. Herein, the eNB that manages the RN is referred to as a Donor eNB (hereinafter referred to as DeNB). Also, an interface that is newly created between the RN and the DeNB, is defined as an Un interface. Herein, the Un interface is differentiated from an Uu interface, which corresponds to the interface between the UE and the RN. The RN may perform the role of managing the UE instead of the DeNB. More specifically, in the perspective of the UE, the RN may be recognized as the eNB, and the Uu interface between the UE and the RN, may adopt the MAC/RLC/PDCP/RRC, which respectively correspond to the Uu interface protocol. Additionally, depending upon the circumstances, in the perspective of the DeNB, the RN may be recognized as the UE or as the eNB. More specifically, when the RN first accesses the DeNB (i.e., when the RN is first connected to the DeNB), since the DeNB is incapable of recognizing the existence of the RN, the RN performs a random access, which is similar to the UE. Then, after accessing the DeNB, the RN operates as the eNB, which manages the UE which is connected to the RN. Therefore, the Un interface protocol may be defined to have both the function of a network protocol and the function of the Uu interface protocol.

Meanwhile, the Un interface may be divided into an inband and an outband. In case the Un interface corresponds to the outband, the Un interface and the Uu interface each uses a different frequency band. Conversely, in case the Un interface corresponds to the inband, both the Un interface and the Uu interface use the same frequency band. Accordingly, when the Un interface corresponds to the inband, wherein both the Un interface and the Uu interface use the same frequency band, an interference may occur between the transmitter and the receiver of the RN. For example, when the RN transmits data to the DeNB, and when the RN receives data from the UE at the same time, an interference may occur. Accordingly, a Backhaul subframe may be set up as a Multicast Broadcast over a Single Frequency Network (MBSFN), which may be used for backhaul partitioning. The Backhaul subframe will be described in more detail along with the description of a general subframe structure with reference to FIG. 5 and FIG. 6.

Figure 3:
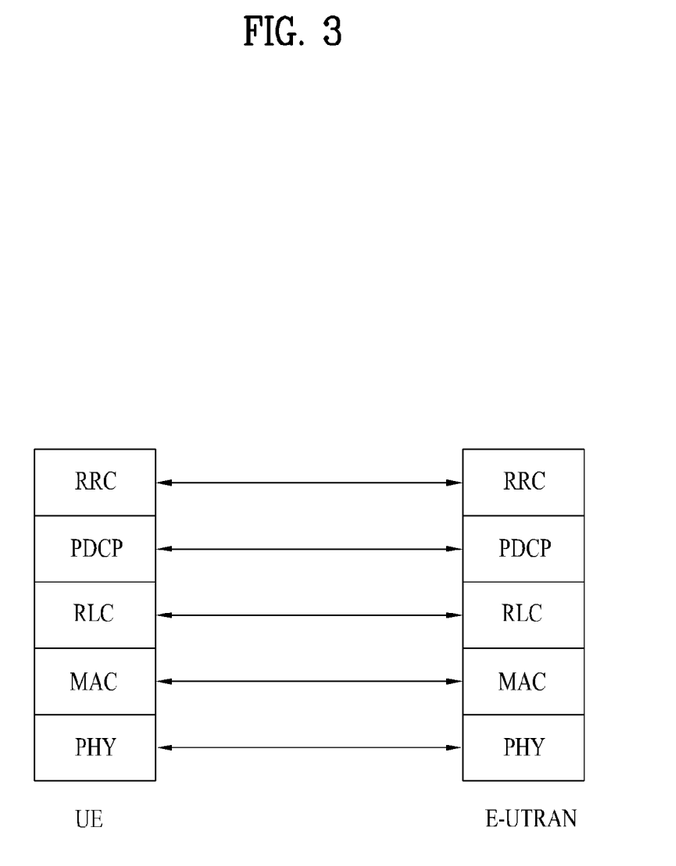
FIG. 3 and FIG. 4 respectively illustrate the structure of a Radio Interface Protocol between an UE and an E-UTRAN based upon a 3GPP wireless access network standard, wherein the present invention is applied.
Figure 4:
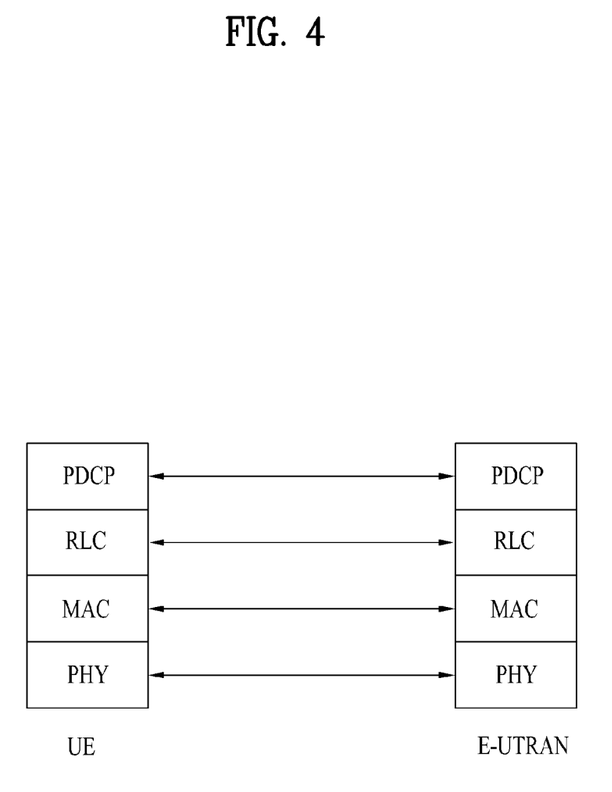

FIG. 3 and FIG. 4 respectively illustrate the structure of a Radio Interface Protocol between a UE and a E-UTRAN based upon a 3GPP wireless (or radio) access network standard wherein the present invention is applied. As described above, since the Un interface protocol between the RN and the DeNB is defined as a structure having the functions of a network protocol added to the functions of the related art Uu interface protocol (i.e., MAC/RLC/PDCP/RRC), the Un interface protocol adopts the structure of an interface protocol between the UE and the E-UTRAN.

A wireless (or radio) interface protocol horizontally consists of a physical layer, a data link layer, and a network layer, and vertically consists of a user plane (or U-Plane) for data information transmission and a control plane (or C-Plane) for delivering control signals (or signaling). The protocol layers shown in FIG. 3 and FIG. 4 may be divided into a first layer (L1), a second layer (L2), and a third layer (L3), based upon 3 lower layers of an Open System Interconnection (OSI) reference model, which is widely known in the communication system. Such wireless protocol layers exist in pairs in the RN and the E-UTRAN, and each layer perform the role of transmitting data of the wireless section.

Hereinafter, each layer of the wireless protocol control plane of FIG. 3 and the wireless protocol user plan of FIG. 4 will be described in detail. The first layer (L1), which corresponds to a physical layer, uses a physical channel to provide an Information Transfer Service to a higher layer. The physical layer is connected to a medium access control layer, which corresponds to a higher layer, through a transport channel. And, herein, data is transported between the medium access layer and the physical layer through the transport channel. In a data transmission between different physical layers, i.e., in a data transmission between a physical layer of the transmitting end and a physical layer of the receiving end, data is transported between the physical layers through a physical channel. Herein, the physical layer is modulated by using Orthogonal Frequency Division Multiplexing (OFDM) and uses time and frequency as the wireless resource. A Medium Access Control (MAC) of the second layer (L2) provides services to a Radio Link Control layer, which corresponds to higher layer, through a logical channel. The Radio Link Control (RLC) layer of the second layer (L2) supports the transmission of reliable data. The function of the RLC layer may also be realized by a functional block within the MAC. In order to efficiently perform transmission in a radio section having a narrow bandwidth when transmitting an IP packet, such as an IPv4 or IPv6, a PDCP layer of the second layer (L2) performs a function of header compression, which can reduce the size of an IP packet header having a relatively large size and carrying unnecessary control information. A radio resource control (RRC) layer which is positioned in the uppermost portion of the third layer (L3) is defined only in the control plane. And, in relation with the configuration, re-configuration, and release of radio bearers (RBs), the RRC layer of the third layer (L3) performs the role of controlling the logical channels, the transmission channels, and the physical channels. The RB refers to a service that is provided by the second layer (L2) in order to deliver data between the UE and the E-UTRAN. In case an RRC connection exists between the RRC layer of the UE and the RRC layer of the E-UTRAN, the UE remains in the RRC connection state (i.e., RRC_CONNECTED). Alternatively, in case the RRC connection does not exist between the RRC layer of the UE and the RRC layer of the E-UTRAN, the UE is in an idle state (i.e., RRC_IDLE). In the network, downlink transmission channels that transmit data to the UE include a broadcast channel (BCH), which transmits system information, and a downlink shared channel (SCH), which transmits information other than the system information, such as user traffic or control messages. In case of traffic information or control messages of a downlink multicast or broadcast service, the corresponding data may be transmitted through a downlink SCH or may also be transmitted through a separate downlink multicast channel (MCH). Meanwhile, uplink transmission channels that transmit data to the UE include a random access channel (RACH), which transmits initial control messages, and an uplink shared channel (SCH), which transmits information other than the system information, such as user traffic or control messages. Logical channels being in a level higher than the transmission channel and being mapped to the transmission channel include a Broadcast Channel (BCCH), a Paging Control Channel (PCCH), a Common Control Channel (CCCH), a Multicast Control Channel (MCCH), a Multicast Traffic Channel (MTCH), and so on.

The following description describes the system information. Herein, the system information includes essential information that is required for the access of the UE to the eNB. Therefore, prior to accessing the eNB, the UE is required to receive all system information and is always required carry the most recent system information. Since the system information corresponds to information that should be known by all UEs existing within a single cell, the eNB periodically transmits the system information. The system information may be divided into a Master Information Block (MIB), a Schedule Block (SB), a System Information Block (SIB), and so on. The MIB informs the UE of the physical configuration (e.g., bandwidth) of the corresponding cell. The SB corresponds to a group of system information each being related to one another. For example, a particular SIB includes only the information on the neighboring cells, and another particular SIB includes only the information on an uplink wireless (or radio) channel that is used by the UE.

Figure 5:
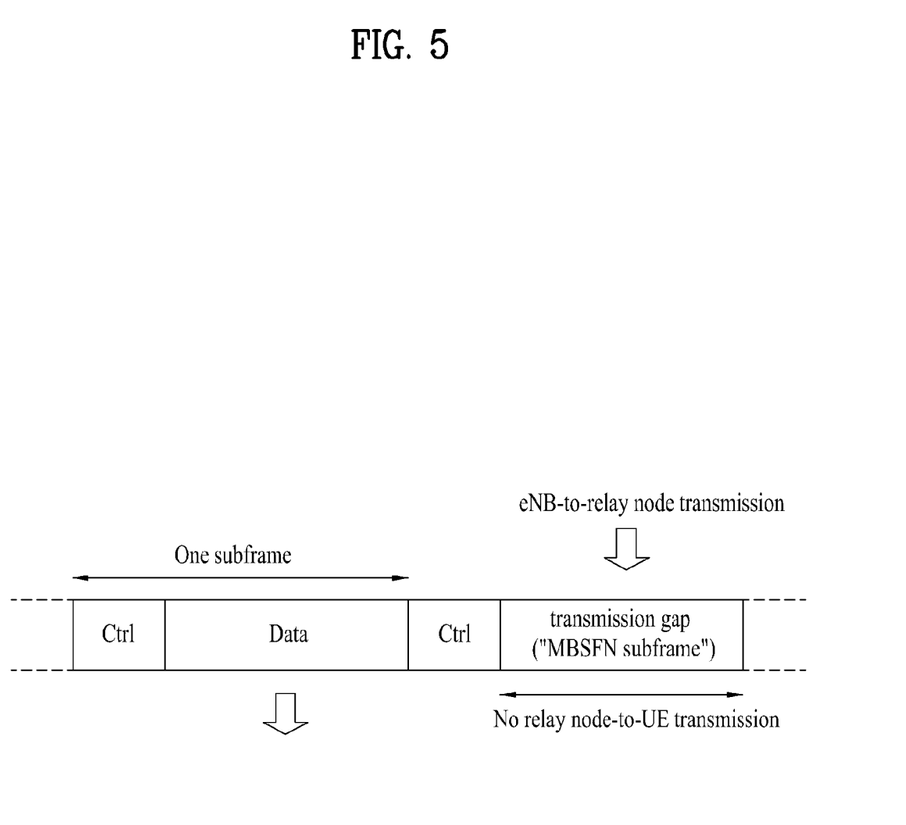
FIG. 5 illustrates the structure of a radio frame wherein the present invention is applied.

FIG. 5 illustrates the structure of a wireless (or radio) frame wherein the present invention is applied. Referring to FIG. 5, the subframe positioned on the left side corresponds to a general subframe, and the subframe positioned on the right side corresponds to a Backhaul subframe and, most particularly, to a Backhaul subframe configured to have the structure of an MBSFN subframe. A general subframe may be used between the UE and the eNB, and an MBSFN subframe may be used between the RN and the DeNB. As described above, in an environment where the Un interface is an inband, and when a general subframe, which is used between the UE and the eNB, is used in this environment, the Backhaul subframe is applied in order to prevent interference from occurring when the RN transmits data to the UE while the RN receives data from the DeNB, or vice versa. Hereinafter, the relation between a general subframe and a Physical Downlink Control Channel (PDCCH), which is received on the general subframe, and the relation between a Backhaul subframe and a Relay-Physical Downlink Control Channel (R-PDCCH), which is received on the Backhaul subframe, will be briefly described with reference to FIG. 6.

Figure 6:
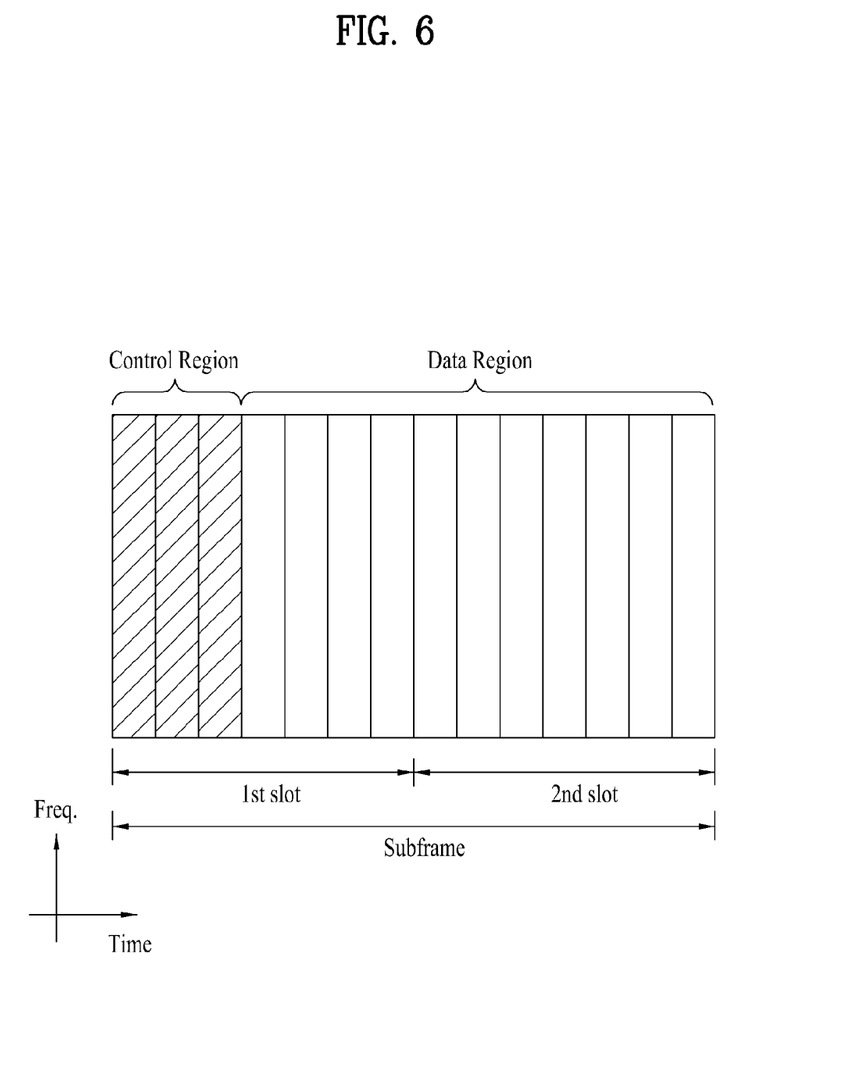
FIG. 6 illustrates the structure of a general downlink subframe, wherein the present invention is applied.

FIG. 6 illustrates the structure of a general downlink subframe wherein the present invention is applied. Referring to FIG. 6, a subframe includes 2 slots in the time domain. A maximum of 3 foremost OFDM symbols of a first slot within the subframe collectively configure a control region, wherein the Physical Downlink Control Channel (PDCCH) is assigned thereto, and the remaining symbols collectively configure a data region, wherein a Physical Downlink Shared Channel (PDSCH) is assigned thereto. Herein, the control information being transmitted through the PDCCH is referred to as Downlink Control Information (DCI), which may include uplink resource allocation information, downlink resource allocation information, and uplink transmission power control commands on random UE groups. The PDCCH may carry and deliver transmission format information and resource allocation information of a downlink shared channel (DL-SCH), paging information within a paging channel (PCH), system information within the DL-SCH, resource allocation information on higher layer control messages, such as random access responses being transmitted within the PDSCH, transmission power control command sets on individual UEs within random UE groups, information on transmission power control commands, information on the activation of a Voice of Internet Protocol (VoIP), and so on. The eNB decides the PDCCH format depending upon the DCI that is to be transmitted to the UE and adds a CRC to the control information. The CRC is masked with a unique identifier (i.e., Radio Network Temporary Identifier (RNTI)) in accordance with the purpose or owner of the PDCCH. More specifically, if the PDCCH is specified for a paging message, a paging indicator identifier (e.g., a Paging-RNTI (P-RNTI)) is masked to the CRC. Also, if the PDCCH is specified for the system information, a system information identifier and a system information RNTI (S-RNTI) may be masked to the CRC. Also, in order to indicate a random access response, which corresponds to a response of the UE to the reception of a random access preamble, a random access RNTI (RA-RNTI) may be masked to the CRC. The structure of a Backhaul subframe is not very different from the above-described subframe structure. The Backhaul subframe according to the present invention may be set up as an MBSFN subframe. The MBSFN subframe may include a control region and a data region. Depending upon the settings, the control region may be allocated to one foremost OFDM symbol section to 3 foremost OFDM symbol sections within the first slot of the MBSFN subframe. Also, depending upon the settings, the data region may be allocated to the entire second slot or to sections of the second slot excluding the last symbol. Herein, a Relay-Physical Downlink Control Channel (R-PDCCH) and a Relay-Physical Downlink Shared Channel (R-PDSCH) may be allocated to the data region of an MBSFN subframe. And, with the exception for the fact that the R-PDCCH corresponds to a relay-specific PDCCH, the R-PDCCH is similar to the PDCCH described above with reference to FIG. 6. In other words, the R-PDCCH transmits relay-specific downlink control information (DCI). For example, the R-PDCCH may deliver relay-specific downlink scheduling information and relay-specific uplink scheduling information. The relay-specific downlink data and messages may be received through the R-PDSCH, which is designated by the R-PDCCH.

Figure 7:
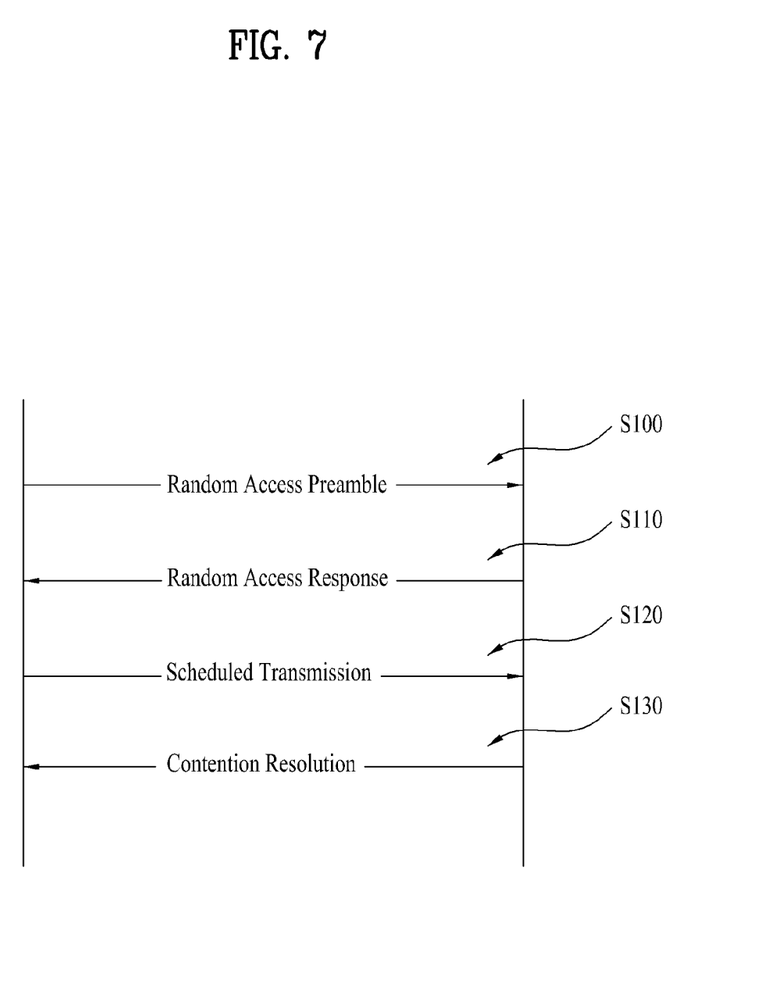
FIG. 7 illustrates a contention based random access procedure according to the present invention.
Figure 8:
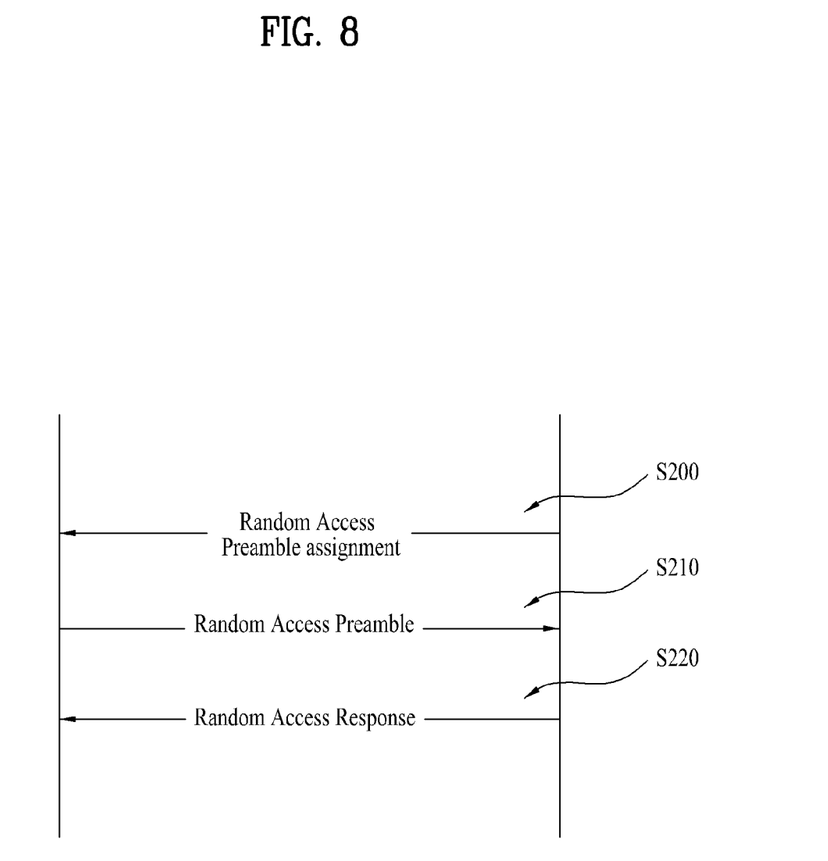
FIG. 8 illustrates a non-contention based random access procedure according to the present invention.

FIG. 7 and FIG. 8 respectively illustrate random access procedures between the UE and the eNB within a mobile communication system according to an embodiment of the present invention. The random access procedure may be performed (1) when the UE performs initial access due to the absence of a connection with the eNB (i.e., RRC connection), (2) when the UE performs access to a target cell for the first time during a handover process, (3) when the random access procedure is requested by a command made from the eNB, (4) when a time synchronization of the uplink is not matched, (5) when data to an uplink is generated in a condition where wireless (or radio) resource is not allocated, and (6) when a recovery process is performed due to a radio link failure or a handover failure. The above-described random access procedure may be divided into a contention based random access procedure and a non-contention based random access procedure. The differentiation between the contention based random access procedure and the non-contention based random access procedure is decided based upon whether an UE has directly selected a random access preamble that is used in the random access procedure, or whether the eNB has selected the random access preamble. During the non-contention based random access procedure, the UE uses a random access preamble, which the eNB has assigned to the UE, and the other UEs do not use the random access preamble assigned to the corresponding UE. Therefore, since a one-to-one (1:1) correspondence is realized between the random access preamble and the UE that uses the corresponding random access preamble, contention does not occur. Additionally, this may be efficient, since the eNB may be informed of the UE, which has transmitted the random access preamble, in advance. Conversely, during the contention based random access procedure, since the UE may randomly select and transmit one of a plurality of available random access preambles, there is always a possibility of multiple UEs using the same random access preamble. Therefore, even if the eNB receives a specific random access preamble, it is difficult to know which UE has transmitted the corresponding random access preamble.

Hereinafter, the contention based random access procedure will now be described in detail with reference to FIG. 7. During the contention based random access procedure, the UE randomly selects one random access preamble from a group of random access preambles designated by the system information or a handover command, and, then, the UE selects a Physical Random Access Channel (PRACH) resource that can transmit the random access preamble and transmits the random access preamble (S100). After transmitting the random access preamble, the UE attempts to receive a random access response within a random access response receiving window, which designates the respective eNB through the system information or the handover command (S110). The random access response may be transmitted in a MAC Protocol Data Unit (PDU) format, and the MAC PDU may be delivered through a Physical Downlink Shared Channel (PDSCH). Additionally, in order to appropriately receive the information that is being delivered through the PDSCH, control information is delivered to the UE through the Physical Downlink Control Channel (PDCCH). More specifically, the information through the PDCCH may include information on the UE that is to receive through the PDSCH, the frequency and time information of the radio resource within the PDSCH, the transmission format of the PDSCH, and so on. If the UE successfully receives the PDCCH, the UE may adequately receive the random access response being transmitted through the PDSCH based upon the control information through the PDCCH. The received random access response may be included in a random access response message. And, herein, the received random access response message may include a random access preamble identifier (ID), an uplink radio resource (UL Grant), a temporary cell identifier (Temporary Cell-Radio Network Temporary Identifier), a time sync compensation value (Time Alignment Command), and so on. Since the MAC PDU or the random access response message may include a plurality of random access responses for UEs, the random access response identifier is used to inform which UE is valid for the information on the uplink radio resource, the temporary cell identifier, and the time sync compensation value in the certain random access response. The random access preamble identifier corresponds to the random access preamble that is selected by the UE during the above-described process. When the UE receives a random access response valid for itself, the corresponding UE processes the information included in the received random access response. The UE applies the time sync compensation value and stores the temporary cell identifier. Also, the UE uses the uplink radio resource in order to transmit the data stored in a buffer of the UE or newly generated data to the eNB (S120). At this point, the data that are transmitted through the uplink radio resource shall essentially include a UE identifier. Since it is difficult for the eNB to determine which UEs perform the random access procedure, during the contention based random access procedure, the UE identifier is required to be included in the transmitted data, so that the problem of contention can be resolved in a later process by identifying the corresponding UE. In case the UE was already carrying a valid cell identifier, which was assigned by a corresponding cell prior to the random access procedure, the UE may transmit the assigned a cell identifier through the uplink radio resource. On the other hand, in case the UE was not assigned with a valid cell identifier, the UE may transmit a higher-level identifier (e.g., S-TMSI or Random ID) as compared to the cell identifier. In case the UE has transmitted data through the uplink radio resource, a Contention Resolution Timer is started. More specifically, after the UE transmits data including its identifier through the uplink radio resource included in the random access response, the UE waits for eNB instructions on the contention resolution. Most particularly, the UE attempts to receive a contention resolution message through the Physical Downlink Shared Channel (PDSCH), which is designated by the Physical Downlink Control Channel (PDCCH). In case the cell identifier is transmitted through the uplink radio resource, the UE uses the cell identifier to attempt reception of the PDCCH. And, in case an identifier of a level higher than the cell identifier is transmitted, the UE attempts to receive the PDCCH by using a temporary cell identifier included in the random access response. Accordingly, in case the UE receives the PDCCH including the cell identifier of the corresponding UE before the contention resolution timer expires, the UE determines that the random access procedure has been performed successfully and ends the random access procedure. Furthermore, in case the UE receives the PDCCH designated by the temporary cell identifier before the contention resolution timer expires, the UE verifies the data through the PDSCH based upon the information that is indicated by the PDCCH. If a unique identifier of the corresponding UE is included in the data (or MAC PDU) through the PDSCH, the UE determines that the random access procedure has been performed successfully and ends the random access procedure (S130).

FIG. 8 illustrates a non-contention based random access procedure according to the present invention. The non-contention based random access procedure may be requested by a handover process or an eNB command.

The UE is assigned with a random access preamble designated solely from the eNB (S200). Random access preamble designating information (e.g., preamble index) may be included in a handover command message or may be received through the PDCCH. The UE transmits the random access preamble to the eNB through the Physical Random Access Channel (PRACH) (S210). The UE receives a random access response corresponding to the random access preamble (S220) and, then, ends the random access procedure. The method of receiving the random access response is identical to the method used in the contention based random access procedure. Meanwhile, in case the distance between the UE and the eNB is far, the relation between the RN and the DeNB within a relay process, which is performed to complement the distance between the UE and the eNB, may be similar to the relation between the UE and the eNB. However, in case the random access procedure of the UE and the eNB is directly applied to the RN and the DeNB, the following problems may occur. First of all, since the RN can only receive a random access response on Backhaul subframes (e.g., MBSFN subframe), if the DeNB transmits a random access response on a section of subframes within the random access response window, the random access procedure may be failed. Furthermore, in case the random access response is transmitted only on a Backhaul subframe, despite being under an urgent condition (e.g., RRC connection re-configuration), the random access procedure may be delayed. Hereinafter, the random access procedure between the RN and the DeNB will now be described in detail with reference to FIG. 9 and FIG. 10.

Figure 9:
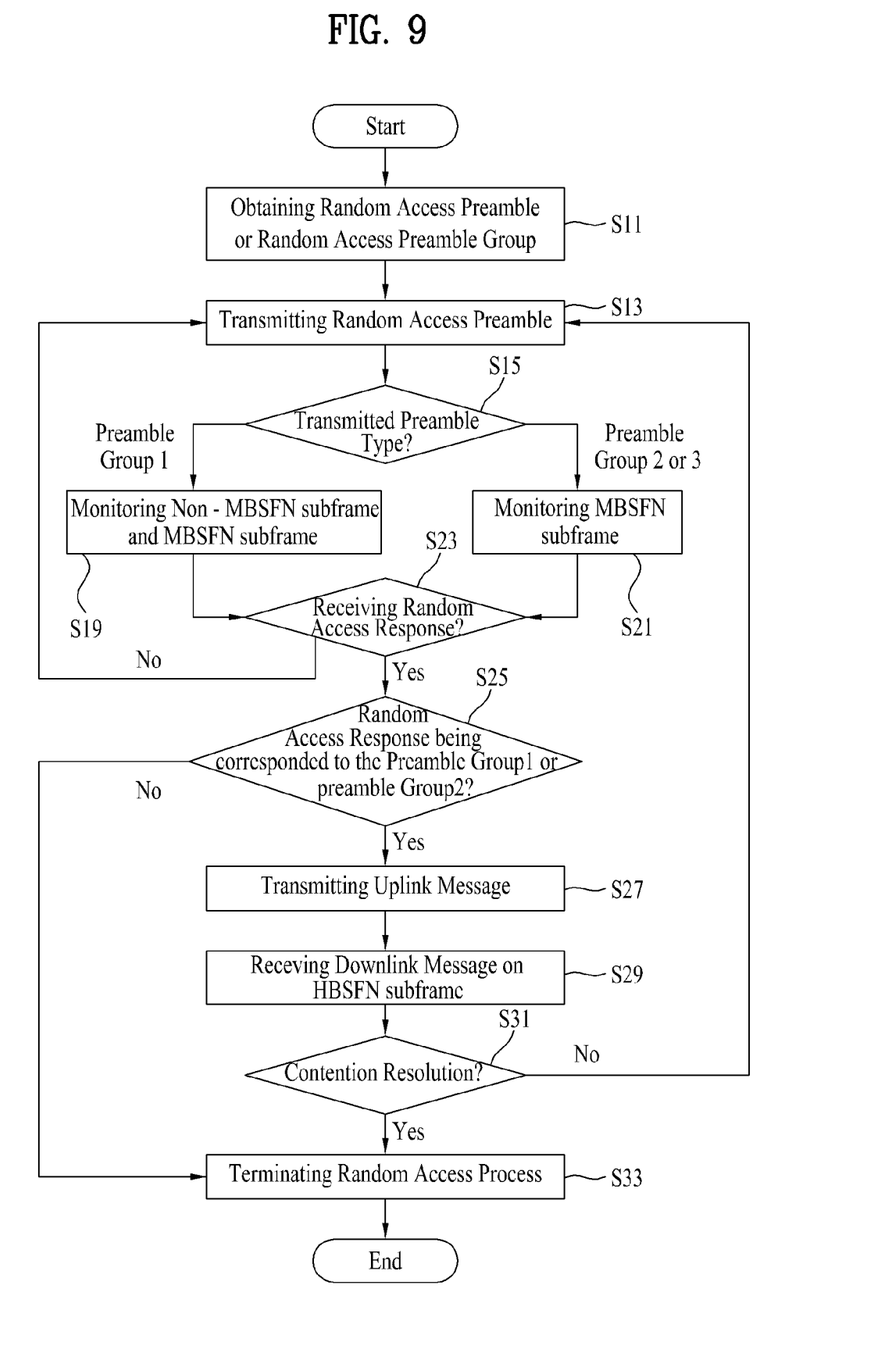
FIG. 9 illustrates a method for performing a random access by a wireless device in a mobile communication system according to an embodiment of the present invention.

FIG. 9 illustrates a method for performing a random access by a wireless device in a mobile communication system according to an embodiment of the present invention. In the description according to the embodiment of the present invention, the RN will be given as an example of the wireless device. However, the present invention will not be limited only to the example given herein. The DeNB may allocate at least one MBSFN subframe to one RN. The RN may receive data or messages on the MBSFN subframe from the DeNB. The RN may receive random access response window size information through the system information from a DeNB. Referring to FIG. 9, the RN may acquire a group of random access preambles or a single random access preamble from the DeNB (S11). Additionally, the group of random access preambles or the single random access preamble may be acquired through an RRC message. Each of the acquired random access preamble includes random access preambles commonly used by the UEs and the RNs (hereinafter referred to as Preamble Group 1) and RN random access preambles used by the RNs. Herein, the RN random access preambles may consist of RN common random access preambles, which are commonly used by multiple RNs, (hereinafter referred to as Preamble Group 2) and an RN dedicated random access preamble for a single RN (hereinafter referred to as Preamble Group 3). After selecting a Physical Random Access Channel (PRACH), which can transmit the random access preamble, the RN may transmit a preamble through the selected PRACH (S13). If the transmitted preamble corresponds to Preamble Group 1, the RN may monitor the MBSFN subframe as well as a non-MBSFN subframe in order to receive a random access response (S15 and S19). The random access response may be received on the MBSFN subframe through a Relay-Physical Downlink Shared Channel (R-PDSCH), which is designated by a Relay-Physical Downlink Control Channel (R-PDCCH), or the random access response may be received on the non-MBSFN subframe through a Physical Downlink Shared Channel (PDSCH), which is designated by a Physical Downlink Control Channel (PDCCH). Meanwhile, if the transmitted preamble corresponds to Preamble Group 1, the random access response may only be received on the non-MBSFN subframe through a Physical Downlink Shared Channel (PDSCH), which is designated by a Physical Downlink Control Channel (PDCCH) in order to receive the random access response (not shown). While the random access response is being received through a non-MBSFN subframe, data and message transmission to the UE and even transmission/reception may be interrupted. Furthermore, while the random access procedure is being performed, all transmission to the UE may be interrupted. Alternatively, if the transmitted preamble corresponds to Preamble Group 2 or Preamble Group 3, the RN may monitor only the MBSFN subframe in order to receive a random access response (S15 and S21). The random access response may be received through the Relay-Physical Downlink Shared Channel (R-PDSCH), which is designated by the Relay-Physical Downlink Control Channel (R-PDCCH). At this point, the RN uses the random access response window size information in the system information received from the DeNB, so as to set up a third subframe after the subframe, which has transmitted the preamble, as the beginning of the window, in case the RN has transmitted the Preamble Group 1 on the subframe. And, starting from the beginning of the window, a section corresponding to the random access response window size may be set up as the window. Alternatively, in case the RN has transmitted the Preamble Group 2 or the Preamble Group 3 on the MBSFN subframe, an MBSFN subframe located most approximately to the MBSFN subframe that has transmitted the preamble may be set up as the beginning of the window, and a section corresponding to the random access response window size may be set up as the window. The configurations of the beginning of the window and the size of the random access response window may be diversely set up while taking certain characteristics into consideration.

When the RN receives a random access response corresponding to the transmitted preamble (S23), and if the received random access response corresponds to Preamble Group 1 or Preamble Group 2 (S25), a contention resolution of the random access may be required. The RN transmits uplink data on a Backhaul subframe (S27), and the RN may receive a message including contention resolution information on the MBSFN subframe from the DeNB (S29). In case the contention resolution is successfully performed using the contention resolution information (S31), the random access may be ended (S33). In case the contention resolution is failed (S31), the random access preamble may be retransmitted (S13). And, if the RN receives the random access response corresponding to Preamble Group 3 (S25), the random access may be ended (S33).

Conversely, in case a random access response corresponding to the transmitted preamble fails to be received (S23), a random access preamble may be retransmitted (S13).

The random access procedure of Preamble Group 1 and Preamble Group 2 may correspond to the contention based random access procedure, and the random access procedure of Preamble Group 3 may correspond to the non-contention based random access procedure.

Contention resolution basically occurs due to a limitation in the number of random access preambles. When two or more RNs receive a random access response, two or more sets of uplink data may be transmitted through the same uplink resource. Therefore, the DeNB is required to notify information on a competition success or competition failure, and this is referred to as contention resolution. If the RN was carrying a unique cell identifier (C-RNTI) prior to the random access procedure, during the transmission of uplink data, the contention resolution allows data including a cell identifier on a Backhaul subframe to be transmitted and also allows the contention resolution timer to be operated. When the RN receives control information including the cell identifier through the R-PDCCH, before the contention resolution timer expires, it may be determined that the contention resolution is successfully completed. Meanwhile, if the RN was not carrying a unique cell identifier prior to the random access procedure, uplink data are transmitted on the Backhaul subframe. Herein, the uplink data include a higher-level identifier (e.g., SAE Temporary Mobile Station Identifier (S-TMSI) or random ID) higher than the cell identifier. Thereafter, when the RN receives control information including the higher-level identifier on the R-PDSCH, before the contention resolution timer expires, it may be determined that the contention resolution is successfully completed.

Figure 10:
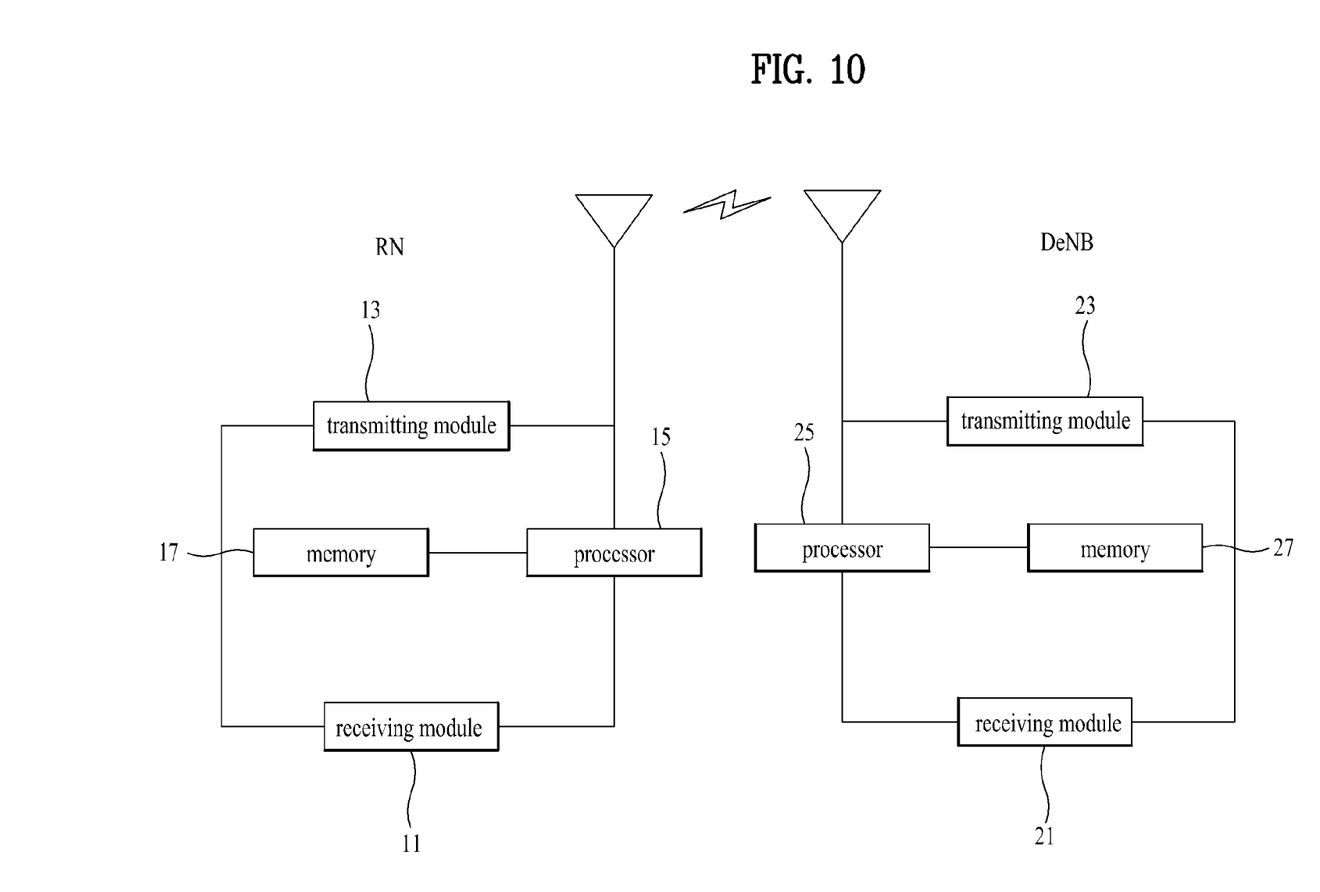
FIG. 10 illustrates wireless device and DeNB configurations in a mobile communication system according to an embodiment of the present invention.

FIG. 10 illustrates wireless device and DeNB configurations in a mobile communication system according to an embodiment of the present invention. In the description according to the embodiment of the present invention, the RN will be given as an example of the wireless device. However, the present invention will not be limited only to the example given herein.

The RN may include a receiving module 11, a transmitting module 13, a processor 15, and a memory 17. The receiving module 11 may be configured to receive diverse types of signals, data, information, and so on, from the DeNB and the UE. The transmitting module 13 may be configured to transmit various signals, data, information, and so on, to the DeNB and the UE. The memory 17 is configured to temporarily store the received signals, data, information, and so on.

The processor 15 may control the receiving module 11 to receive data or messages on the assigned MBSFN subframe from the DeNB. Also, the processor 15 may control the receiving module 11 to receive random access response window size information in the system information from the DeNB. The processor 15 may control the receiving module 11 to acquire a group of random access preambles or a single random access preamble from the DeNB. Furthermore, the group of random access preambles or the single random access preamble may be acquired through an RRC message (e.g., system information or handover command). Each of the acquired random access preamble includes random access preambles commonly used by the UEs and the RNs (hereinafter referred to as Preamble Group 1) and RN random access preambles used by the RNs. Herein, the RN random access preambles may consist of RN common random access preambles, which are commonly used by multiple RNs, (hereinafter referred to as Preamble Group 2) and an RN dedicated random access preamble for a single RN (hereinafter referred to as Preamble Group 3). After selecting a Physical Random Access Channel (PRACH), which can transmit the random access preamble, the processor 15 may transmit a preamble from any one of Preamble Group 1, Preamble Group 2, and Preamble Group 3 through the selected PRACH.

When the RN transmits the Preamble Group 1, the processor 15 may control the receiving module 11 to receive a random access response on all types of subframes (e.g., non-MBSFN subframes) including the MBSFN subframes. Also, the processor 15 may control the receiving module 11 to only receive a random access response on the non-MBSFN subframes. Meanwhile, while receiving the random access response on the non-MBSFN subframes, the processor 15 may control the receiving module 11 to interrupt data or message transmission to the UE.

When the RN transmits the Preamble Group 2 and the Preamble Group 3, the processor 15 may control the receiving module 11 to receive a random access response on MBSFN subframes. At this point, the processor 15 may use the random access response window size information in the system information, so as to set up a third subframe after the subframe, which has transmitted the preamble, as the beginning of the window, in case the RN has transmitted the Preamble Group 1 on the subframe. And, starting from the beginning of the window, a section corresponding to the random access response window size may be set up as the window. Alternatively, if the RN has transmitted the Preamble Group 2 or the Preamble Group 3 on the MBSFN subframe, an MBSFN subframe located most approximately to the MBSFN subframe that has transmitted the preamble may be set up as the beginning of the window, and a section corresponding to the random access response window size may be set up as the window. The configurations of the beginning of the window and the size of the random access response window may be diversely set up while taking certain characteristics into consideration.

When the processor 15 receives a random access response corresponding to the transmitted preamble, and if the received random access response corresponds to Preamble Group 1 or Preamble Group 2, the processor 15 may control the transmitting module 13 to transmit uplink data on a Backhaul subframe. Thereafter, the processor 15 may control the receiving module 11 to receive a message or data on the MBSFN subframe. In case the received random access response corresponds to Preamble Group 3, the random access procedure may be ended. In case the random access response fails to be received during the random access response window, the processor 15 may control the transmitting module 13 to retransmit the random access preamble. In case the processor 15 has transmitted Preamble Group 1 or Preamble Group 2, the RN may receive contention resolution information on the MBSFN subframe. If the contention resolution is successfully performed using the contention resolution information, the random access procedure may be ended. And, if the contention resolution is failed, the random access preamble may be retransmitted.

The DeNB may include a receiving module 21, a transmitting module 23, a processor 25, and a memory 27. The receiving module 21 may be configured to receive diverse types of signals, data, information, and so on, from the RN and the UE. The transmitting module 23 may be configured to transmit various signals, data, information, and so on, to the RN and the UE. The memory 17 may be configured to temporarily store operated information, the received signals, data, information, and so on. Herein, the memory 17 may be replaced with another element such as a buffer (not shown).

The processor 25 of the DeNB may allocate at least one MBSFN subframe with respect to a single RN. Also, the processor 25 may control the transmitting module 23 to transmit the random access response window size information.

Additionally, the processor 25 may configure Physical Random Access Channel (PRACH) resource that can be randomly used by all UEs and RNs connected to the DeNB. Furthermore, the processor 25 may control the transmitting module 23 to transmit messages or data corresponding to messages or data, received from the RN.

As described above, the method of performing a random access in a mobile communication system and the apparatus for the same according to the present invention can efficiently performing random access of a wireless device limited to a wireless (or radio) interface.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A method of performing a random access at a relay node in a mobile communication system, the method comprising:

a) transmitting a random access preamble in a specific subframe to a base station;
b) if the random access preamble is a dedicated preamble, monitoring a Relay-Physical Downlink Control Channel (R-PDCCH) in a data region of a Multicast Broadcast over a Single Frequency Network (MBSFN) subframe, and receiving a random access response included in a Relay-Physical Downlink Shared Channel (R-PDSCH) in the data region of the MBSFN subframe based on the R-PDCCH from the base station; and
c) if the random access preamble is a non-dedicated preamble, monitoring a Physical Downlink Control Channel (PDCCH) in a control region of a non-Multicast Broadcast over a Single Frequency Network (non-MBSFN) subframe, and receiving the random access response included in a Physical Downlink Shared Channel (PDSCH) in the data region of the non-MBSFN subframe based on the PDCCH from the base station,
wherein the MBSFN subframe and the non-MBSFN subframe are located within a predetermined window after the specific subframe, and
wherein the starting subframe of the predetermined window for the MBSFN subframe is different from the starting subframe of the predetermined window for the non-MBSFN subframe.

2. The method of claim 1, wherein the dedicated preamble is allocated by a Physical Downlink Control Channel (PDCCH) order.

3. The method of claim 1, wherein, if the random access preamble is the dedicated preamble, the monitoring includes monitoring a Random Access-Radio Network Temporary Identifier (RA-RNTI) through the R-PDCCH.

4. The method of claim 1, wherein the MBSFN subframe is a backhaul subframe.

5. The method of claim 1, further comprising:
transmitting an uplink message to the base station after receiving the random access response; and
receiving a contention resolution message from the base station,
wherein the uplink message includes a relay node identifier.

6. The method of claim 1, further comprising:
stopping transmission to a user equipment (UE) during receiving the random access response if the random access preamble is the dedicated preamble.

7. The method of claim 5, wherein the relay node identifier being received through the Relay-Physical Downlink Control Channel (R-PDCCH) is used for a contention resolution if the random access preamble is the dedicated preamble.

8. A method of performing random access at a base station in a mobile communication system, the method comprising:
a) receiving a random access preamble in a specific subframe from a relay node;
b) if the random access preamble is a dedicated preamble, transmitting a Relay-Physical Downlink Control Channel (R-PDCCH) through a data region of a Multicast Broadcast over a Single Frequency Network (MBSFN) subframe to the relay node, and transmitting a Relay-Physical Downlink Shared Channel (R-PDSCH) including a random access response through the data region of the MBSFN subframe to the relay node, wherein the R-PDCCH indicates the R-PDSCH; and
c) if the random access preamble is a non-dedicated preamble, transmitting a Physical Downlink Control Channel (PDCCH) through a control region of a non-Multicast Broadcast over a Single Frequency Network (non-MBSFN) subframe to the relay node, and transmitting a Physical Downlink Shared Channel (PDSCH) including the random access response in the data region of the non-MBSFN subframe to the relay node, wherein the PDCCH indicates the PDSCH, wherein the MBSFN subframe and the non-MBSFN subframe are located within a predetermined window after the specific subframe, and wherein the starting subframe of the predetermined window for the MBSFN subframe is different from the starting subframe of the predetermined window for the non-MBSFN subframe.

9. The method of claim 8, wherein the dedicated preamble is allocated by a Physical Downlink Control Channel (PDCCH) order.

10. The method of claim 8, further comprising:

transmitting a Random Access-Radio Network Temporary Identifier (RA-RNTI) through the Relay-Physical Downlink Control Channel (R-PDCCH) if the random access preamble is the dedicated preamble.

11. The method of claim 8, wherein the MBSFN subframe is a backhaul subframe.

12. The method of claim 8, further comprising:

receiving an uplink message from the relay node after transmitting the random access response; and transmitting a contention resolution message to the relay node, wherein the uplink message includes a relay node identifier.

13. The method of claim 12, wherein the relay node identifier being transmitted through the Relay-Physical Downlink Control Channel (R-PDCCH) is used for a contention resolution if the random access preamble is the dedicated preamble.

14. A device configured to perform a random access at a relay node in a mobile communication system, the device comprising:

a transmitter configured to transmit a random access preamble in a specific subframe to a base station; and a receiver configured to:

a) monitor a Relay-Physical Downlink Control Channel (R-PDCCH) in a data region of a Single Frequency Network (MBSFN) subframe and receive a random access response included in a Relay-Physical Downlink Shared Channel (R-PDSCH) in the data region of the MBSFN subframe based on the R-PDCCH from the base station if the random access preamble is a dedicated preamble, and b) monitor a Physical Downlink Control Channel (PDCCH) in a control region of a non-Multicast Broadcast over a Single Frequency Network (non-MBSFN) subframe and receive the random access response included in a Physical Downlink Shared Channel (PDCCH) in the data region of the non-MBSFN subframe based on the PDCCH from the base station, wherein the MBSFN subframe and the non-MBSFN subframe are located within a predetermined window after the specific subframe, and wherein the starting subframe of the predetermined window for the MBSFN subframe is different from the starting subframe of the predetermined window for the non-MBSFN subframe.

* * * * *